US009729179B1

(12) United States Patent
Emadi et al.

(10) Patent No.: US 9,729,179 B1
(45) Date of Patent: Aug. 8, 2017

(54) FEED-FORWARD INTERFERENCE CANCELLATION IN A RECEIVER

(71) Applicant: QUALCOMM Incorporated, San Diego, CA (US)

(72) Inventors: Mohammad Emadi, San Jose, CA (US); Mazhareddin Taghivand, Campbell, CA (US); Yann Ly-Gagnon, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/190,444

(22) Filed: Jun. 23, 2016

(51) Int. Cl.
*H04B 1/10* (2006.01)
*H04B 1/12* (2006.01)

(52) U.S. Cl.
CPC ........... *H04B 1/123* (2013.01); *H04B 1/1027* (2013.01)

(58) Field of Classification Search
CPC .. H04B 1/525; H03F 2200/294; H03F 1/3223
USPC ... 455/296, 126, 63.1, 222, 226.1, 306, 570, 455/67.13; 330/149
See application file for complete search history.

(56) References Cited

U.S. PATENT DOCUMENTS

| | | | | |
|---|---|---|---|---|
| 6,670,865 | B2 * | 12/2003 | Lopez | H04B 1/18 330/252 |
| 7,979,029 | B2 | 7/2011 | Murakami | |
| 8,086,205 | B2 * | 12/2011 | Thomas | H04B 1/006 370/286 |
| 8,098,779 | B2 | 1/2012 | Komninakis et al. | |
| 8,306,480 | B2 | 11/2012 | Muhammad et al. | |
| 8,676,143 | B2 * | 3/2014 | Thomas | H04B 1/006 370/286 |
| 8,755,756 | B1 | 6/2014 | Zhang et al. | |
| 8,934,587 | B2 | 1/2015 | Weber et al. | |
| 2014/0348018 | A1 | 11/2014 | Bharadia et al. | |

OTHER PUBLICATIONS

Darabi H., "A Blocker Filtering Technique for Wireless Receivers," IEEE International Solid-State Circuits Conference, Feb. 2007, pp. 84-85.
Bharadia D., et al., "FastForward: Fast and Constructive Full Duplex Relays," in SIGCOMM 2014, New York, 2014, 12 pages.
Hwang I., et al., "Analog Wideband Interference Cancellation for In-Device Multi-Radio Coexistence", QTECH, 2014, 10 pages.
Ly-Gagnon Y., et al., "Blind Interference Cancellation for Concurrent BT/WLAN Operation", 2016, 9 pages.

* cited by examiner

*Primary Examiner* — Sonny Trinh
(74) *Attorney, Agent, or Firm* — Muncy, Geissler, Olds & Lowe, P.C./QUALCOMM

(57) ABSTRACT

Systems and methods for interference cancellation in a receiver of wireless signals include receiving a signal comprising an aggressor and a desired signal. The received signal is amplified in a low noise amplifier (LNA) to generate an amplified received signal. The aggressor is extracted from the received signal in a feed-forward path between an input of the LNA and an output of the LNA, to generate an extracted aggressor and the extracted aggressor is subtracted from the amplified received signal to provide the desired signal. An amplify and rotate block in the feed-forward path is used to align a phase of the aggressor to a phase of the amplified received signal in order to enable the subtraction.

15 Claims, 4 Drawing Sheets

FEED-FORWARD INTERFERENCE CANCELLATION IN A RECEIVER

FIELD OF DISCLOSURE

Disclosed aspects relate to a receiver of wireless signals. More specifically, exemplary aspects are directed to a feed-forward path in the receiver, configured for interference cancellation.

BACKGROUND

Wireless communication systems may include transmitters and receivers (or combinations thereof) of wireless signals. A transmitter may modulate a desired signal to a carrier frequency for transmission on a wireless communication channel. The receiver may receive the wireless signals and demodulate the received signals to extract the desired signal. However, various sources of noise and interference (e.g., in-band or out-of-band signals from nearby communication channels) can cause distortion and corruption of the wireless signals. Interfering signals, referred to as jammers, may mix with the desired signal being transmitted. However, non-linear characteristics of the receiver may cause difficulties in extraction of the jammer from the received signal to obtain the desired signal.

Some conventional receiver designs incorporate external filters such as surface acoustic wave (SAW), bulk acoustic wave (BAW), film bulk acoustic resonator (FBAR), lumped inductor (L) and capacitor (C) filters, etc., in an attempt to filter out the jammer to obtain the desired signal. But these external filters are not only expensive, but they also incur significant added costs in the receiver, e.g., in terms of additional input/output pins for coupling the external filters, long wire traces for interconnections, etc.

Therefore, there is a need for techniques which avoid the aforementioned problems of conventional receivers.

SUMMARY

The following presents a simplified summary relating to one or more aspects disclosed herein. Systems and methods for interference cancellation in a receiver of wireless signals include receiving a signal comprising an aggressor and a desired signal. The received signal is amplified in a low noise amplifier (LNA) to generate an amplified received signal. The aggressor is extracted from the received signal in a feed-forward path between an input of the LNA and an output of the LNA, to generate an extracted aggressor and the extracted aggressor is subtracted from the amplified received signal to provide the desired signal. An amplify and rotate block in the feed-forward path is used to align a phase of the aggressor to a phase of the amplified received signal in order to enable the subtraction.

Accordingly, an exemplary aspect is directed to a method for interference cancellation in a receiver of wireless signals, the method comprising receiving a received signal comprising an aggressor and a desired signal, amplifying the received signal in a low noise amplifier (LNA) to generate an amplified received signal, extracting the aggressor from the received signal in a feed-forward path between an input of the LNA and an output of the LNA, to generate an extracted aggressor, and subtracting the extracted aggressor from the amplified received signal.

Another exemplary aspect is directed to a receiver of wireless signals. The receiver comprises a received signal received as an input, the received signal comprising an aggressor and a desired signal, a low noise amplifier (LNA) configured to amplify the received signal to generate an amplified received signal, and a feed-forward path configured to extract the aggressor from the received signal to generate an extracted aggressor, the feed-forward path provided between an input of a low noise amplifier (LNA) and an output of the LNA. A subtractor is configured to subtract the extracted aggressor from the amplified received signal Yet another exemplary aspect is directed to an apparatus comprising means for receiving a received signal comprising an aggressor and a desired signal, first means for amplifying the received signal to generate an amplified received signal, means for extracting the aggressor from the received signal in a feed-forward path between an input of the first means for amplifying and an output of the means for amplifying, to generate an extracted aggressor, and means for subtracting the extracted aggressor from the amplified received signal.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
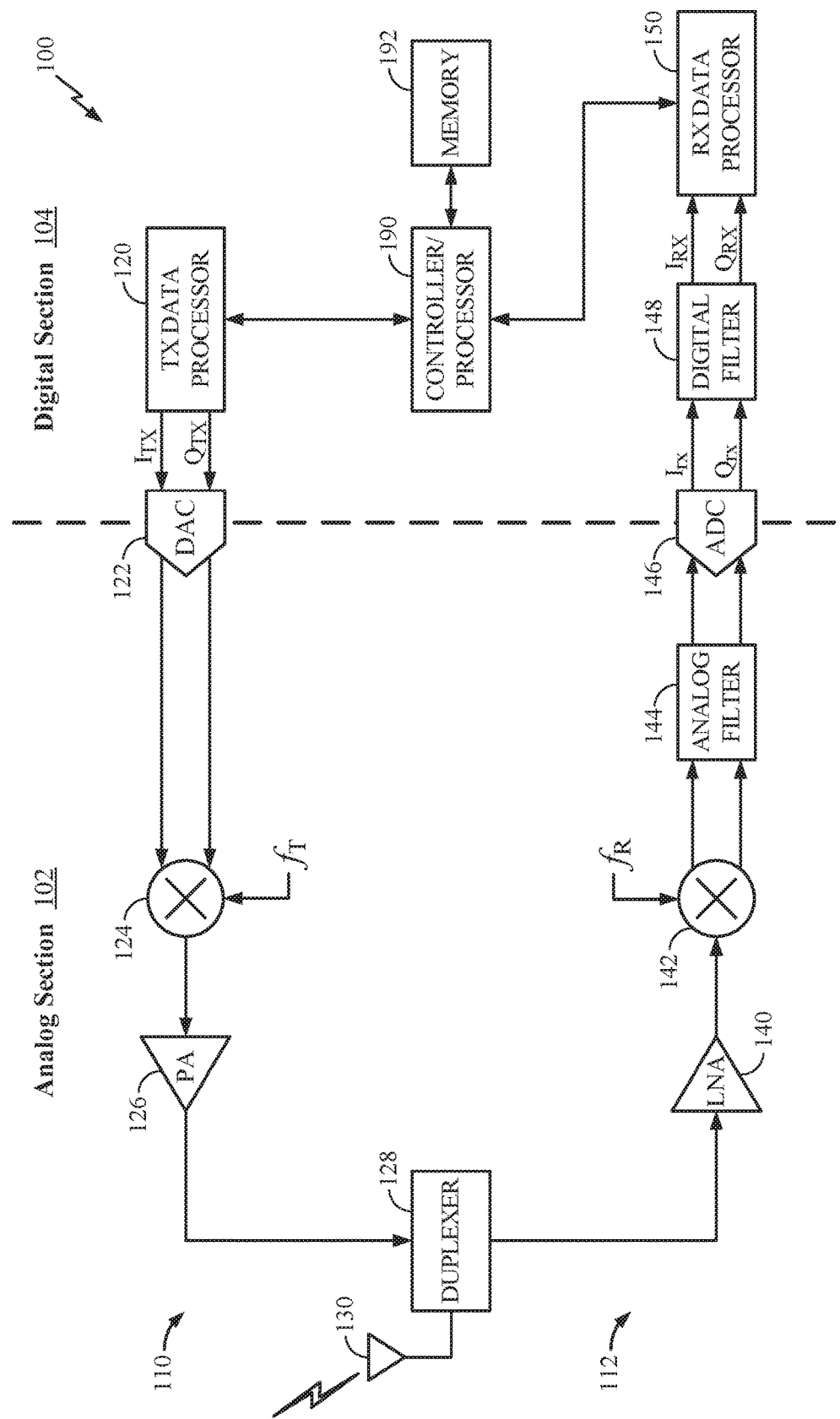
FIG. 1 illustrates a conventional wireless device comprising a transmitter and a receiver.

Various aspects are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter.

Exemplary aspects of this disclosure are directed to mitigating the effects of interference from aggressor/jammer signals on a desired signal received by a receiver. An exemplary receiver may be incorporated in a wireless device, a base station, other electronics devices. A wireless device may also be referred to as a mobile station, a user equipment, a user terminal, a subscriber unit, etc. An example wireless device may be a cellular phone, a personal digital assistant (PDA), a wireless modem, a handheld device, a handset, etc. The techniques may also be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Wireless Local Area Network (WLAN), Bluetooth (BT), etc.

With reference first to FIG. 1 a block diagram of a conventional wireless device 100 is shown. Wireless device 100 is shown to comprise analog section 102 which includes a transmitter side and a receiver side, designated by the reference numerals 110 and 112, respectively. Also shown are controller/processor 190 configured to direct operation of the various units within transmitter and receiver sides 110 and 112 of wireless device 100, and memory 192 configured to store instructions and data, for example, for wireless device 100.

On the transmitter side 110, there is shown to be transmit (TX) data processor 120, which processes data to be transmitted and provides a digital in-phase (I) signal, $I_{TX}$, and a digital quadrature (Q) signal, $Q_{TX}$ to digital-to-analog converter (DAC) 122. DAC 122 converts $I_{TX}$ and $Q_{TX}$ into analog I and Q signals. Mixer 124 modulates a transmit local oscillator (LO) signal with the analog I and Q signals and provides a modulated signal. The transmit LO signal is at a frequency of fT, which is determined by a frequency channel used for data transmission by wireless device 100. Power amplifier (PA) 126 amplifies the modulated signal and provides a transmit signal, which is routed, for example, through duplexer 128 and transmitted via antenna 130.

On the receiver side 112, there is shown to be low noise amplifier (LNA) 140, mixer 142, and analog filter 144. Antenna 130 can also be configured to receive signals (e.g., transmitted by base stations and various interfering sources) and provide a received signal to duplexer 128, which can route the received signal from antenna 130 to LNA 140. LNA 140 amplifies the received signal and provides an amplified signal. Mixer 142 demodulates the amplified signal with a receive (RX) LO signal and provides baseband I and Q signals. The RX LO signal is at a frequency of fR, which is determined by a frequency channel being received by wireless device 100. Analog filter 144 is configured to filter the baseband I and Q signals with the intent of removing noise and other components and provide filtered I and Q signals. Analog filter 144 may perform anti-alias filtering for the subsequent digitization process. Analog-to-digital converter (ADC) 146 is configured to digitize the filtered I and Q signals and provide digital I and Q signals, shown as $I_{RX}$ and $Q_{RX}$ to digital filter 148. Digital filter 148 which is configured to filter $I_{RX}$ and $Q_{RX}$ to provide digital I and Q signals shown as $I_{RX}$ and $Q_{RX}$. Digital filter 148 may also be configured to attenuate noise and other components generated by the digitization process and may pass a desired signal of interest to receive (RX) data processor 150 configured to process the received I and Q signals and provide decoded data.

If the received signal from antenna 130 has a large aggressor or jammer signal (noise), then LNA 140 may reach saturation, or in other words cease to provide the amplification expected. Analog filter 144 may also be unable to effectively filter out the aggressor signal, and subsequently, digital filter 148 may be unable to successfully attenuate the aggressor signal to correctly extract the desired signal and provide the decoded data. The aggressor signal may arise due to concurrent transmission of a signal whose TX LO frequency fT on transmitter side 110 comprising PA 126 interferes with RX LO frequency fR of a signal received on receiver side 112 comprising LNA 140. In a non-limiting example mentioned purely for the sake of illustration herein, the transmitter side signal may be a WLAN signal at 2.4 GHz and the receiver side signal may be a Bluetooth signal, both at a 2.4 GHz band. The WLAN signal may contribute to noise or an aggressor signal in the reception of the Bluetooth signal (this problem may occur in situations where transmitter side 110 and receiver side 112 are integrated on the same chip or on different chips).

Figure 2:
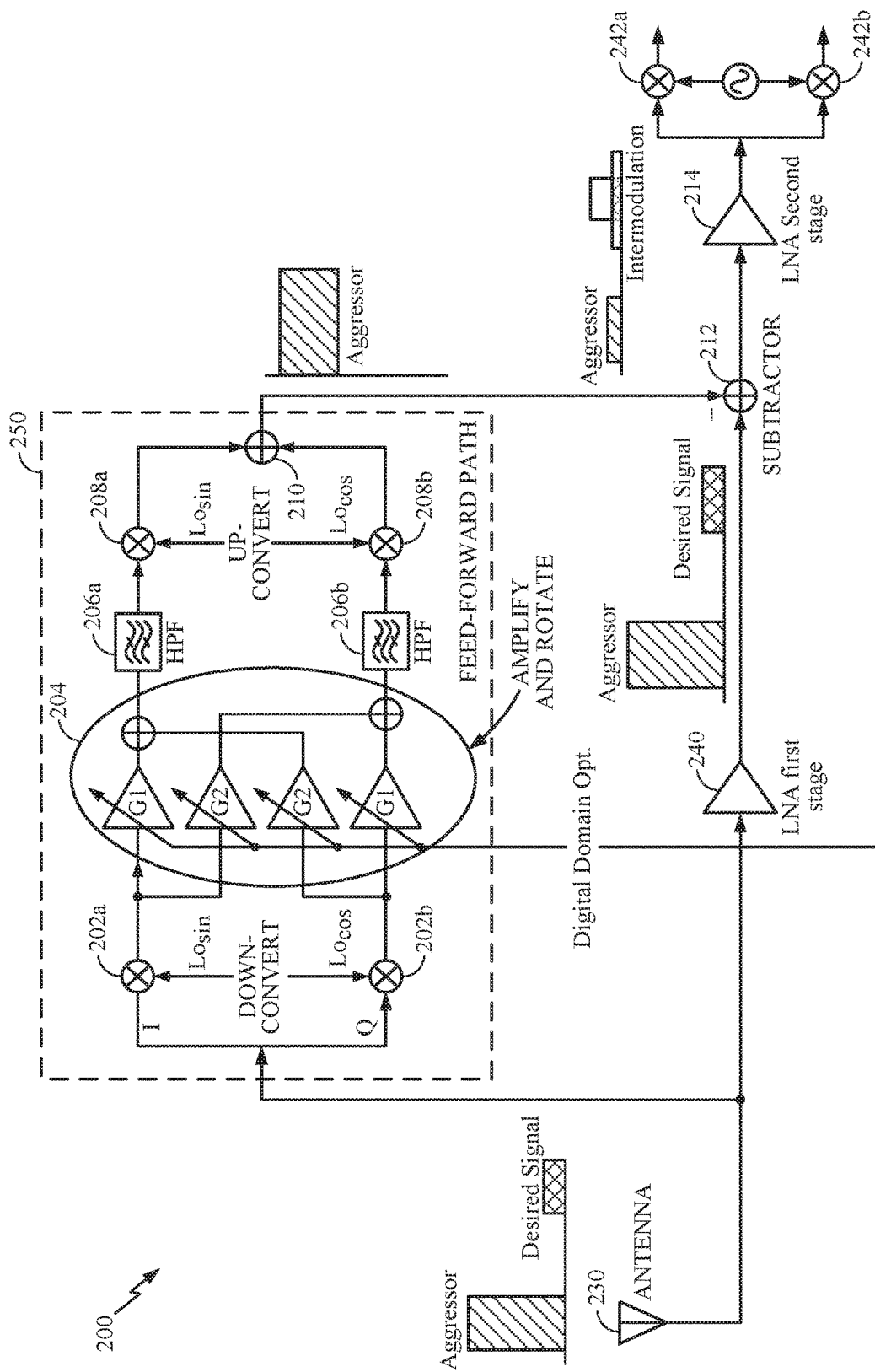
FIG. 2 illustrates an exemplary receiver configured for interference cancellation according to aspects of this disclosure.

With reference now to FIG. 2, an exemplary receiver 200 configured according to exemplary aspects is shown. Receiver 200 may be part of a wireless device (e.g., wireless device 100) and comprise, among other features, feed-forward path 250 implemented between an input and an output of LNA 240. Receiver 200 is configured to avoid the aforementioned interference problems that receiver side 112 of FIG. 1 may be subjected to. In this regard, receiver 200 feed-forward path 250 is designed to estimate the aggressor from a received signal at the input of LNA 240 in order to subtract the aggressor from the main path of the received signal through LNA 240 and thus, retrieve the desired signal without interference from the aggressor. This implementation of feed-forward path 250 may be referred to as a blind cancellation method since it does not require any reference signal from the transmitter of the aggressor (e.g., a transmitter side 110 transmitting a WLAN signal at an interfering frequency of receiver 200 configured to receive a Bluetooth signal, in one non-limiting example). The exemplary implementation of feed-forward path 250 is configured to mix the received signal to a baseband frequency or LO; apply a complex multiplication to align the phase of the received signal with the phase of the aggressor; implement a high pass filter (HPF) to extract the aggressor signal; and up-convert the aggressor to the received signal's RF or transmission frequency (e.g., 2.4 GHz) for subtraction from the received signal. An example implementation of feed-forward path 250 will now be explained in further detail.

With continued reference to FIG. 2, receiver 200 comprises antenna 230 configured to receive wireless signals, referred to as the received signal, which can comprise the aggressor (e.g., of high amplitude as shown) and the desired signal. The received signal from antenna 230 (which includes both the aggressor and the desired signal) are provided to feed-forward path 250 as well as to LNA 240. In one implementation, LNA 240 may be configured as the first stage of a multiple-stage (e.g., dual-stage) LNA. The output of LNA 240 is an amplified received signal comprising the aggressor and the desired signal.

The modulated in-phase (I) and quadrature (Q) components of the received signal in FIG. 2 are provided to both LNA 240 as well as feed-forward path 250. The I and Q components are at the carrier frequency or transmission frequency (e.g., 2.4 GHz) received at antenna 230 (keeping in mind that there may be a frequency offset between the aggressor and the desired signal which form the received signal). A first set of mixers 202*a-b* shown in feed-forward path 250 are configured to down-convert the I and Q components to baseband frequency by multiplying them with sine and cosine values of the receiver's LO frequency. The output of the first set of mixers 202*a-b* may be passed through a low pass filter (LPF) in some implementations, although this is not explicitly shown in the figure. As shown, the outputs of the first set of mixers 202*a-b* are provided to the block designated as amplify and rotate 204.

Amplify and rotate block 204 amplifies the outputs of mixers 202*a-b* (e.g., by gains G1 and G2) and rotates them (i.e., adjusts phase). The amplification or gain values of G1 and G2 may be chosen to correspond to the gain of LNA 240. As shown, the rotation is achieved by the swizzle and add function comprising adding the down-converted I component is multiplied by G1 to the down-converted Q component multiplied by G2; and the adding the down-converted I component is multiplied by G1 to the down-converted Q component multiplied by G2. The amplification and phase rotation implemented in n this manner in block 204 causes the phase of the signal passing through feed-forward path 250 to be aligned to the phase of the received signal. Accordingly, by extracting the aggressor alone from feed-forward path 250 makes it possible to subtract the aggressor from the received signal amplified by LNA 240.

In order to extract the aggressor, the output of amplify and rotate block 204 is passed through high pass filters 206*a-b*, which filter out the desired signal while retaining only the aggressor. The aggressor obtained at the output of high pass filters 206*a-b* is then up-converted to the carrier frequency by a second set of mixers 208*a-b*. The outputs of mixers 208*a-b* are added together in adder 210 to generate only the extracted aggressor component (a real signal) at the carrier frequency.

Since the phase of the aggressor at the output of adder 210 is now aligned to the phase of the output of LNA 240 which comprises the aggressor and desired signal, subtractor 212 is used to subtract out the aggressor from the output of LNA 240, thus retaining only the desired signal at the output of the subtractor 212. The desired signal at the output of subtractor 212 can then be provided to second stage LNA 214 for further amplification before being supplied to mixers 242*a-b*, for example.

In some aspects, feed-forward path 250 can be selectively enabled or disabled based on detecting the power of the received signal or more specifically, based on whether or not an aggressor is detected in the received signal. For example, a power detector may be used to determine if the power of the received signal is higher than would be anticipated for only the desired signal, which would indicate the presence of an aggressor of high amplitude, causing a switch, for example, to selectively enable the use of feed-forward path 250 as discussed above. If the power detector does not detect a high enough power to estimate that there is a large aggressor, feed-forward path 250 may not be enabled, which would save power. Furthermore, referring to the example of FIG. 1 where a wireless device such as wireless device 100 may comprise both transmitter side 110 which generates the aggressor and receiver side 112 which may be the victim of the aggressor, it is possible to selectively enable the exemplary interference cancellation technique by enabling feed-forward path 250 to extract the aggressor and cancel it from the desired signal if an aggressor is detected on the transmitter side 110.

The placement of LNAs can be varied in different aspects of this disclosure. The two-stage LNA configuration of receiver 200 shown in FIG. 2 allows interference-cancellation as above for the first-stage and the second stage LNA can generally be used to amplify the desired signal mainly, before sending to other mixers in the receiver.

Figure 3:
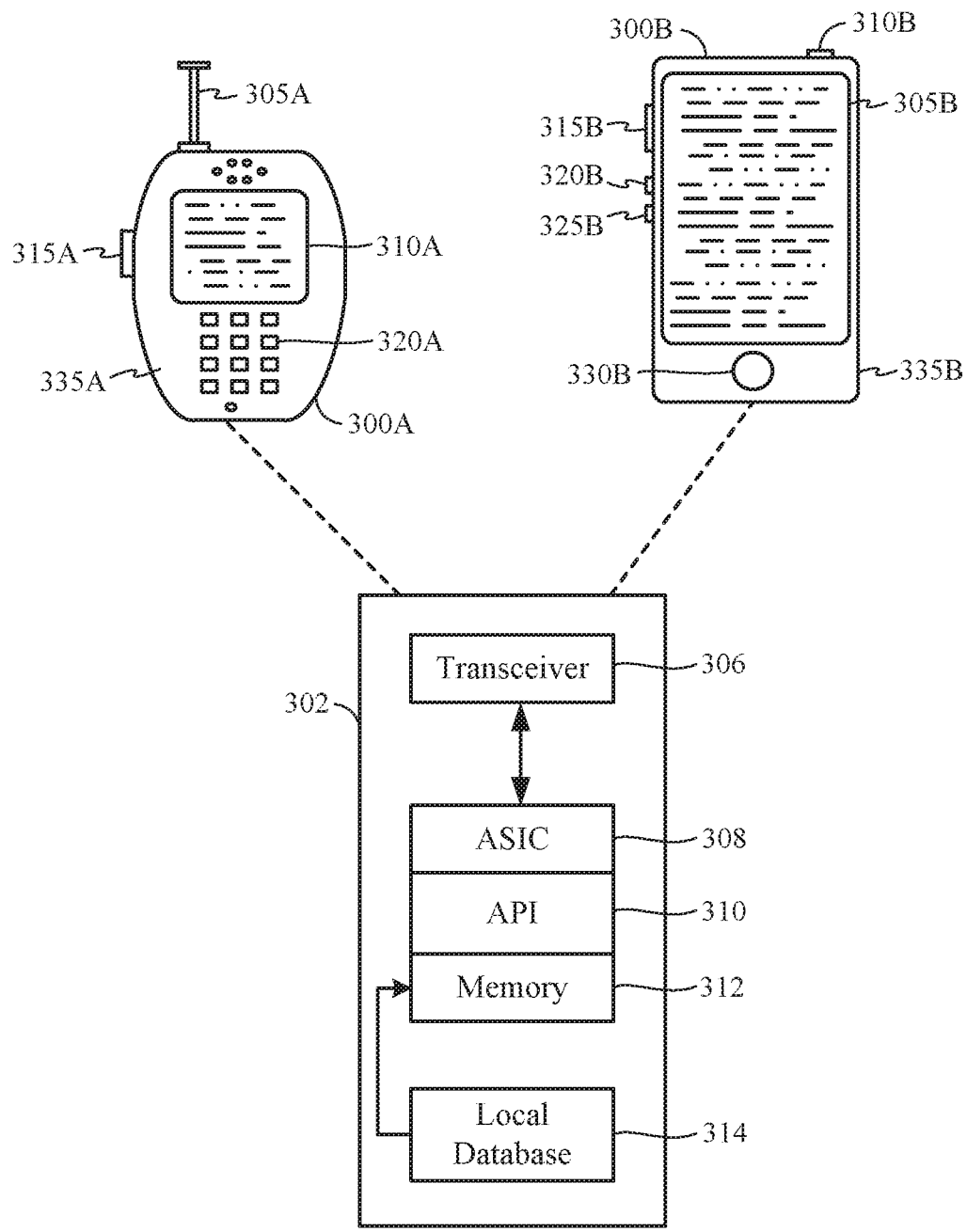
FIG. 3 illustrates exemplary wireless devices in which aspects of this disclosure may be advantageously employed.

With reference now to FIG. 3, example wireless devices 300A and 300B, according to aspects of the disclosure are illustrated. In some examples, wireless devices 300A and 300B may herein be referred to as wireless mobile stations. The example wireless device 300A is illustrated in FIG. 3 as a calling telephone and wireless device 300B is illustrated as a touchscreen device (e.g., a smart phone, a tablet computer, etc.). As shown in FIG. 3, an exterior housing 335A of wireless device 300A is configured with antenna 305A, display 310A, at least one button 315A (e.g., a PTT button, a power button, a volume control button, etc.) and keypad 320A among other components, not shown in FIG. 3 for clarity. An exterior housing 335B of wireless device 300B is configured with touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, not shown in FIG. 3 for clarity. For example, while not shown explicitly as part of wireless device 300B, wireless device 300B may include one or more external antennas and/or one or more integrated antennas that are built into the exterior housing 335B of wireless device 300B, including but not limited to WiFi antennas, cellular antennas, satellite position system (SPS) antennas (e.g., global positioning system (GPS) antennas), and so on.

While internal components of wireless devices such as the wireless devices 300A and 300B can be embodied with different hardware configurations, a basic high-level configuration for internal hardware components is shown as platform 302 in FIG. 3. Platform 302 can receive and execute software applications, data and/or commands transmitted from a radio access network (RAN) that may ultimately come from a core network, the Internet and/or other remote servers and networks (e.g., an application server, web URLs, etc.). Platform 302 can also independently execute locally stored applications without RAN interaction. Platform 302 can include a transceiver 306 operably coupled to an application specific integrated circuit (ASIC) 308, or other processor, microprocessor, logic circuit, or other data processing device. ASIC 308 or other processor executes an application programming interface (API) 310 layer that interfaces with any resident programs in a memory 312 of the electronic device. Memory 312 can be comprised of read-only or random-access memory (RAM and ROM), EEPROM, flash cards, or any memory common to computer platforms. Platform 702 also can include a local database 314 that can store applications not actively used in memory 312, as well as other data. Local database 314 is typically a flash memory cell, but can be any secondary storage device as known in the art, such as magnetic media, EEPROM, optical media, tape, soft or hard disk, or the like.

In one aspect, wireless communications by wireless devices 300A and 300B may be enabled by the transceiver 306 based on different technologies, such as CDMA, W-CDMA, time division multiple access (TDMA), frequency division multiple access (FDMA), Orthogonal Frequency Division Multiplexing (OFDM), GSM, 2G, 3G, 4G, LTE, or other protocols that may be used in a wireless communications network or a data communications network. Voice transmission and/or data can be transmitted to the electronic devices from a RAN using a variety of networks and configurations. Accordingly, the illustrations provided herein are not intended to limit the aspects of the invention and are merely to aid in the description of aspects of aspects of the invention.

Accordingly, aspects of the present disclosure can include a wireless device (e.g., wireless devices 300A, 300B, etc.) configured, and including the ability to perform the functions as described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the wireless devices 300A and 300B in FIG. 3 are to be considered merely illustrative and the invention is not limited to the illustrated features or arrangement.

Figure 4:
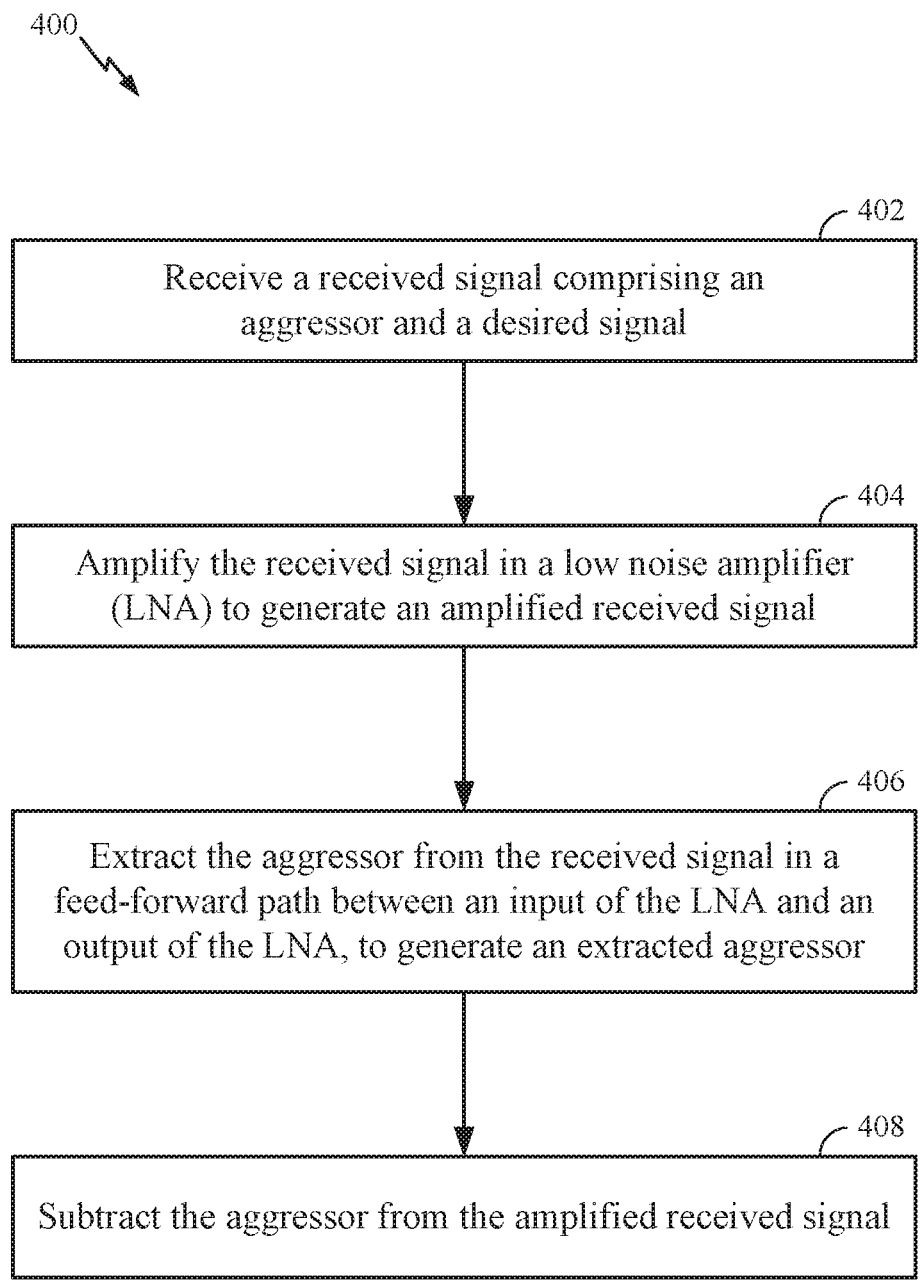
FIG. 4 illustrates an example process for interference cancellation, according to aspects of the disclosure.

Accordingly, it will be appreciated that exemplary aspects include various methods for performing the processes, functions and/or algorithms disclosed herein. For example, FIG. 4 illustrates an example method (400) for interference cancellation in a receiver (e.g., receiver 200) of wireless signals.

Block 402 of method 400 comprises receiving a received signal comprising an aggressor and a desired signal (e.g., from antenna 230).

Block 404 comprises amplifying the received signal in a low noise amplifier (e.g., LNA 240) to generate an amplified received signal (e.g., provided to subtractor 212).

Block 406 comprises extracting the aggressor from the received signal in a feed-forward path (e.g., 250) between an input of the LNA and an output of the LNA, to generate an extracted aggressor (e.g., also provided to subtractor 212). As discussed previously, feed-forward path 250 can include amplify and rotate block 204, for example, to align the phase of the aggressor for effective interference cancellation from the received signal.

Block 408 comprises subtracting, e.g., in subtractor 212, the extracted aggressor from the amplified received signal for obtaining the desired signal.

Further, those of skill in the art will appreciate that the various illustrative logical blocks, modules, circuits, and algorithm steps described in connection with the aspects disclosed herein may be implemented as electronic hardware or a combination of computer software and electronic hardware. To clearly illustrate this interchangeability of hardware and hardware-software combinations, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a non-transitory computer-readable media embodying a method for interference cancellation in a receiver using a feed-forward path. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method for interference cancellation in a receiver of wireless signals, the method comprising:
   receiving a received signal comprising an aggressor and a desired signal;
   amplifying the received signal in a low noise amplifier (LNA) to generate an amplified received signal;
   extracting the aggressor from the received signal in a feed-forward path between an input of the LNA and an output of the LNA, to generate an extracted aggressor;
   subtracting the extracted aggressor from the amplified received signal; and
   selectively disabling the feed-forward path if interference from the aggressor is not detected in the received signal.

2. The method of claim 1, comprising, in the feed-forward path:
   down-converting in-phase (I) and quadrature (Q) components of the received signal to baseband frequency using a first set of mixers;
   amplifying and rotating outputs of the first set of mixers in an amplify and rotate block;
   filtering out the desired signal from outputs of the amplify and rotate block in high pass filters;
   up-converting outputs of the high pass filters to a carrier frequency of the received signal using a second set of mixers; and
   adding outputs of the second set of mixers in an adder to generate the extracted aggressor.

3. The method of claim 2, comprising aligning a phase of the aggressor to a phase of the received signal in the amplify and rotate block.

4. The method of claim 2, comprising amplifying the outputs of the first set of mixers by first and second gain values to correspond to an amplification of the LNA.

5. The method of claim 1, further comprising obtaining the desired signal based on the subtraction and providing the desired signal to a second LNA.

6. A receiver of wireless signals, the receiver comprising:
- a received signal received as an input, the received signal comprising an aggressor and a desired signal;
- a low noise amplifier (LNA) configured to amplify the received signal to generate an amplified received signal;
- a feed-forward path configured to extract the aggressor from the received signal to generate an extracted aggressor, the feed-forward path provided between an input of a low noise amplifier (LNA) and an output of the LNA; and
- a subtractor configured to subtract the extracted aggressor from the amplified received signal,
- wherein the feed-forward path is configured to be selectively disabled if interference from the aggressor is not detected in the received signal.

7. The receiver of claim 6, wherein the feed-forward path comprises:
- a first set of mixers configured to down-convert in-phase (I) and quadrature (Q) components of the received signal to baseband frequency;
- an amplify and rotate block configured to amplify and rotate outputs of the first set of mixers;
- high pass filters configured to filter out the desired signal from outputs of the amplify and rotate block;
- a second set of mixers configured to up-convert outputs of the high pass filters to a carrier frequency of the received signal; and
- an adder configured to add outputs of the second set of mixers to generate the extracted aggressor.

8. The receiver of claim 7, wherein the amplify and rotate block is configured to align a phase of the aggressor to a phase of the received signal.

9. The receiver of claim 7, wherein the amplify and rotate block is configured to amplify the outputs of the first set of mixers by first and second gain values to correspond to an amplification of the LNA.

10. The receiver of claim 6, wherein the desired signal provided at an output of the subtractor is amplified in a second LNA.

11. An apparatus comprising:
- means for receiving a received signal comprising an aggressor and a desired signal;
- first means for amplifying the received signal to generate an amplified received signal;
- means for extracting the aggressor from the received signal in a feed-forward path between an input of the first means for amplifying and an output of the means for amplifying, to generate an extracted aggressor;
- means for subtracting the extracted aggressor from the amplified received signal; and
- means for selectively disabling the feed-forward path if interference from the aggressor is not detected in the received signal.

12. The apparatus of claim 11, wherein the feed-forward path comprises:
- means for down-converting in-phase (I) and quadrature (Q) components of the received signal to baseband frequency;
- means for amplifying and rotating outputs of the means for down-converting;
- means for filtering out the desired signal from outputs of means for amplifying and rotating;
- means for up-converting outputs of the means for filtering out; and
- means for adding outputs of the means for up-converting to generate the extracted aggressor.

13. The apparatus of claim 12, wherein the means for amplifying and rotating comprises means for aligning a phase of the aggressor to a phase of the received signal.

14. The apparatus of claim 12, wherein the means for amplifying and rotating comprises means for amplifying the outputs of the means for down-converting by first and second gain values to correspond to an amplification of the means for amplifying.

15. The apparatus of claim 11, further comprising means for obtaining the desired signal based on the subtraction and second means for amplifying the desired signal.

* * * * *